Patented July 20, 1943

2,324,740

UNITED STATES PATENT OFFICE 2,324,740

STABILIZED LIQUID COATING COMPOSITION

William N. Stoops, Charleston, and Walter A. Denison, South Charleston, W. Va., assignors to Carbide and Carbon Chemicals Corporation, a corporation of New York No Drawing. Application January 10, 1941, Serial No. 373,958

3 Claims. (Cl. 260—32)

This invention pertains to the prevention of gelation in liquid coating compositions on storage. The method of this invention is effective in preventing gelation of liquid coating compositions which contain both polyhydric alcohols and macromolecular substances having free carboxyl groups. The invention is primarily directed to the stabilization of liquid varnish compositions containing, as the polyhydric alcohol, a polyalkylene glycol and, as the macromolecular substance, a conjoint polymer of a vinyl compound with maleic acid or its derivatives.

Compositions such as these, and the enamel formed therefrom by the reaction of the conjoint polymer with the polyalkylene glycol, are described in our copending application Serial No. 296,040, filed September 22, 1939, with which the present application contains subject matter in common. As explained in more detail in that application, the vinyl compound employed in the formation of the conjoint polymer is a monomeric vinyl compound of the structure R.CH:CH$_2$, where R may be an organic radical having at least one benzene ring, a lower aliphatic acyloxy group, or a halogen atom. Maleic acid and its derivatives which may constitute the acidic part of the conjoint polymer may be grouped in the class of unsaturated dicarboxyl compounds of the structure,

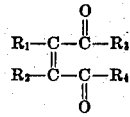

where either R$_1$ or R$_2$, or both, are hydrogen, a lower alkyl group, an aryl group, or an aralkyl group, and R$_3$ and R$_4$ are OH, or R$_3$ and R$_4$, taken together, are O, or R$_3$ is OH and R$_4$ is a lower oxyalkyl group. Examples of monomeric vinyl compounds which are suitable for use in the above polymerization are styrene, vinyl naphthalene, methyl isopropenyl benzene, vinyl acetate, vinyl propionate, vinyl butyrate, vinyl chloride, and vinyl bromide. Examples of unsaturated dicarboxyl compounds which are suitable to be conjointly polymerized with the monomeric vinyl compounds are maleic anhydride, maleic acid, methyl maleic acid, dimethyl maleic acid, phenyl maleic acid, mono-methyl maleate, mono-ethyl maleate, mono-methyl fumarate and mono-ethyl fumarate. There results from this polymerization a thermo plastic resin which has at least one reactive carboxyl group per mol of combined unsaturated dicarboxyl compound. It is soluble in aqueous alkaline solutions and in many organic solvents.

The polyalkylene glycol employed to react with the conjoint polymer to form the protective film may be any polyalkylene glycol having at least three alkylene glycol units in the molecule. Examples of such polyalkylene glycols are tri-, tetra-, penta-, hexa-, hepta-, octaethylene and higher glycols; the corresponding polypropylene and polybutylene glycols; and mixed polyglycols, such as symmetrical diethylene dipropylene glycol.

The conjoint polymer resin and the polyalkylene glycol are customarily applied to the surface to be coated in the form of a dispersion in an organic solvent, although in some cases aqueous alkaline solutions may be employed since the carboxyl-containing conjoint polymer is soluble in such solutions. After application of the varnish or liquid coating composition to the surface to be coated, the coated article is baked at an elevated temperature. The baking operation serves to remove the excess solvent and to cause the polyalkylene glycol and the carboxyl-containing conjoint polymer to react to form an insoluble and infusible coating of great tenacity and of high chemical resistance. Since the resultant film has high dielectric strength, the coating composition is an excellent insulating varnish and has proved to be a very satisfactory wire enamel.

It has been noted that varnishes or liquid coating compositions of the above type exhibit a pronounced tendency towards gel formation on storage. This condition is presumed to be caused by the gradual reaction of the polyalkylene glycol with the carboxyl-containing conjoint polymer to form an insoluble resin. While this tendency towards gelation is not pronounced if the varnish is used shortly after its preparation, it has been found that dilute varnishes containing a total of less than 25% by weight of the resin and polyalkylene glycol will set to a gel in from two to five months, depending upon the other constituents of the varnish, whereas more concentrated coating compositions, such as those containing a total of about 40% by weight of resin and polyalkylene glycol, will form gels much more rapidly. In this latter case, gel formation may occur after about two weeks storage and it is almost certain to develop after storage for about five weeks. The specific solvents employed in the varnish have an effect upon the time required for gelation to be initiated but in no case has any single solvent been found which inhibited the gelation of varnishes of a commercially applicable concentration for more than a few months. The solvents which were tested with this point in view included acetone, dioxane, mesityl oxide, isophorone, acetonyl acetone and furfural. The gelation which is encountered in these varnishes on storage appears to be of a permanent, rather than a thixotropic, nature and for this reason it is impractical to apply the varnish after gelation has occurred.

According to this invention, it has been found that the tendency towards gelation in a varnish composed of a solution of a conjoint polymer of a vinyl compound with maleic acid, or its derivatives, and the cross-linking reactant therefore, the polyalkylene glycol, can be substantially eliminated by the inclusion in the varnish of a volatile monofunctional material which is reactive at room temperature with the free carboxyl group of the conjoint polymer to form a compound which is unstable on heating.

One method of stabilization which is particularly effective is the addition of a small amount of a monohydric alcohol to the varnish. The various alcohols which have been tried, such as methanol, ethanol, isopropanol, butanol, ethylene chlorhydrin and ethylene glycol monoethyl ether, have all proved to be of great assistance in reducing the tendency towards gelation, although they are not all equally effective. In general, it has been found that the lower boiling alcohols retard the appearance of gelation for the longest period.

The effectiveness of the alcohols in inhibiting gelation of the varnish increases according to their concentration. However, the amount of the alcohols which can be added to the varnish is limited since they are non-solvents for the resin. In general, the amount that can be tolerated will vary from between 20 and 30% by weight of the varnish composition depending upon the particular alcohol and solvent employed in the varnish and upon the concentration of the resin and polyalkylene glycol. In the special case, however, of mixtures of alcohols with volatile aromatic hydrocarbons, the above generalization does not apply since these mixtures are solvents for the resin, although neither component alone is a solvent.

It is believed that the monohydric alcohols retard gelation in the varnish because of their reaction with the resin to some extent, probably by condensation with the carboxyl groups. The monohydric alcohols are more reactive than the polyalkylene glycols and they preferentially react with the conjoint polymer resin for this reason. However, having but one hydroxyl group, the monohydric alcohols do not serve to cross-link the large resin molecules as do the polyalkylene glycols and in this manner gelation is avoided. It has been found that the alcohols are more effective in retarding gelation if the resin solution containing the monohydric alcohol, but no polyalkylene glycol, is heated for a few hours at an elevated temperature, say from 100° to 150° C. It is also requisite that the alcohol employed as a stabilizer be more or less volatile so that it will evaporate rapidly from the varnish composition at temperatures of 200° to 450° C. which are those customarily employed in the baking operation. It is probable that the combination of the resin and the monohydric alcohol is of a non-permanent nature and that some or all of the alcohol which is thus combined with the resin is replaced by the polyalkylene glycol during the baking operation. In any event, it has been found the amounts of the monohydric alcohols required to prevent gelation do not deleteriously affect the formation of the insoluble and infusible film by the reaction of the resin and polyalkylene glycol.

Other embodiments of the invention which provide lacquers stable on storage involve the dispersion of the conjoint polymer resin in aqueous ammonia or the addition of volatile amines, particularly cyclic or aromatic mono-amines, such as morpholine and aniline, to a dispersion of the resin in an organic solvent. The ammonia forms an unstable ammonium compound with the resin and the amines form salts, or amides, with it by virtue of the carboxyl groups therein and none of these products react with the polyalkylene glycol at ordinary temperatures. However, at the high temperature involved during baking, the ammonium compound or the amine salt or amide is decomposed, resulting in the release of ammonia or the free amine and the restoration of the reactivity of the carboxyl groups of the resin with the polyalkylene glycol.

In the following examples, the resin and the polyglycol mixtures employed were taken from identical batches for comparative purposes:

*Example 1.*—In an accelerated test of the tendency towards gelation, a varnish containing, by weight, 20% of a conjoint polymer of styrene with maleic anhydride, 20% of a mixture of polyethylene glycols having a large fraction of hexaethylene glycol and 60% furfural was heated at 98° C. It was found that the solution became a gel in 130 minutes. A varnish containing butanol as an inhibitor of gel formation was then prepared, the final composition of the varnish being, by weight, 20% resin, 20% mixed polyglycols, 20% butanol and 40% furfural. This solution formed a gel only after 315 minutes under the same conditions of heating. Methanol was then added to another solution having a somewhat lower concentration of resin, the composition of the varnish being by weight 16.7% resin, 16.7% polyethylene glycols, 16.7% methanol and 50% furfural. This solution became a gel only after 1260 minutes of heating at 98° C.

*Example 2.*—A varnish containing 10.7% of a conjoint polymer of styrene and maleic anhydride, 10.7% mixed polyethylene glycols and 78.6% furfural became a permanent gel when heated at 98° C. for 500 minutes. The addition of a small amount of butanol to the ungelled varnish decreased the tendency towards gelation; the actual composition tested being composed of, by weight, 10.7% resin, 10.7% mixed polyethylene glycols, 4% butanol and 74.6% furfural. This solution became a gel after 700 minutes of heating under the same test, indicating the effect of even small amounts of the monohydric alcohols. A similar solution containing by weight 10.7% resin, 10.7% mixed polyethylene glycols, 4% methanol and 74.6% furfural, became a gel only after 1030 minutes of heating at 98° C. which indicates the superiority of the lower monohydric alcohols as inhibitors of gelation.

*Example 3.*—This example illustrates the embodiment of the invention in which the alcohol inhibitor and the resin are separately reacted prior to the addition of the polyalkylene glycol. To effect this, a solution containing by weight 12.0% of the conjoint polymer of styrene with maleic anhydride, 4.5% butanol and 83.5% furfural was heated for 13 hours at 95° C. Sufficient polyethylene glycol was then added to the solution to form a varnish having the following composition by weight, 10.7% resin, 10.7% polyethylene glycol, 4.0% butanol and 74.6% furfural. By heating the solution to 98° C. it was found that gel formation was retarded for 1230 minutes. This compares with a gel-free period of 700 minutes for a solution of the same composition, as described in Example 2, which had not received the preliminary heat treatment.

*Example 4.*—This example shows the effectiveness of amines in retarding the tendency towards gelation. A varnish consisting of, by weight, 9% of a conjoint polymer of styrene and maleic anhydride, 9% of mixed polyethylene glycols, 41% of xylene and 41% of ethylene glycol monoethyl ether, which serves both as an adjuvant solvent and a stabilizer, did not change in viscosity on storage for two months but increased in viscosity on storage for 12 months from an original value of 23 seconds to 33 seconds (Ford Cup). However, the addition of 2% by weight of aniline to another varnish of the same composition resulted in a product which showed no change in viscosity on storage for 10 months.

Modifications of the invention other than as described in the foregoing examples will be apparent to those skilled in the art and are included within the scope of the invention as defined by the appended claims.

We claim:

1. A liquid coating composition stabilized against gelation on storage comprising a dispersion in aqueous ammonia of a conjoint polymer of a vinyl compound of the group consisting of styrene, vinyl acetate, and vinyl chloride with a compound of the group consisting of maleic acid and maleic anhydride, and a higher polyalkylene glycol in which the hydroxyl groups are separated by at least three alkylene radicals joined by oxygen atoms.

2. A liquid coating composition stabilized against gelation on storage comprising a dispersion in aqueous ammonia of a conjoint polymer of styrene with maleic anhydride and a higher polyalkylene glycol in which the hydroxyl groups are separated by at least three alkylene radicals joined by oxygen atoms.

3. A liquid coating composition stabilized against gelation on storage comprising a dispersion in aqueous ammonia of a conjoint polymer of styrene with maleic anhydride, and a polyethylene glycol in which the hydroxyl groups are separated by at least three ethylene radicals joined by oxygen atoms.

WILLIAM N. STOOPS.
WALTER A. DENISON.